(12) United States Patent
Hause et al.

(10) Patent No.: US 11,632,932 B2
(45) Date of Patent: Apr. 25, 2023

(54) FAN FOR USE IN AGRICULTURE

(71) Applicant: Munters Corporation, Mason, MI (US)

(72) Inventors: Christopher A. Hause, Eaton Rapids, MI (US); Ross L. Demerly, Owosso, MI (US); Daniel G. Hansen, Holt, MI (US); Chistopher B. Witt, Lansing, MI (US); John Van Camp, Okemos, MI (US)

(73) Assignee: Munters Corporation, Lansing, MI (US)

( * ) Notice: Subject to any disclaimer, the term of this patent is extended or adjusted under 35 U.S.C. 154(b) by 885 days.

(21) Appl. No.: 15/782,506

(22) Filed: Oct. 12, 2017

(65) Prior Publication Data

US 2018/0034392 A1     Feb. 1, 2018

Related U.S. Application Data

(62) Division of application No. 12/774,818, filed on May 6, 2010, now Pat. No. 10,097,119.

(Continued)

(51) Int. Cl.
*A01K 1/00* (2006.01)
*F04D 27/00* (2006.01)
(Continued)

(52) U.S. Cl.
CPC .......... *A01K 1/0047* (2013.01); *A01K 1/0052* (2013.01); *F04D 27/004* (2013.01);
(Continued)

(58) Field of Classification Search
CPC .. A01K 1/0047; A01K 1/0052; A01K 1/0058; A01K 1/0064; F24F 2011/0002;
(Continued)

(56) References Cited

U.S. PATENT DOCUMENTS

| | | |
|---|---|---|
| 4,506,199 A | 3/1985 | Asche |
| 4,563,622 A | 1/1986 | Deavers et al. |

(Continued)

FOREIGN PATENT DOCUMENTS

| | | |
|---|---|---|
| DE | 200 13 286 U1 | 11/2000 |
| EP | 0 100 214 A2 | 2/1984 |

(Continued)

OTHER PUBLICATIONS

English machine translation of description for JP2004027921A dated 2004 (Year: 2004).*

(Continued)

*Primary Examiner* — Nathan C Zollinger
(74) *Attorney, Agent, or Firm* — Venable LLP (57) ABSTRACT

A fan for use in agriculture which has a BLDC motor which allows for varying the speed of the fan to vary the airflow rate of the fan and vary the efficiency of the fan. A ventilation system for use in a livestock confinement building to maximize a rate of growth of the livestock. A process for maximizing the growth of livestock in a livestock confinement building by controlling the airflow in the livestock confinement building.

12 Claims, 8 Drawing Sheets

Related U.S. Application Data (60) Provisional application No. 61/175,970, filed on May 6, 2009.

(51) Int. Cl.

| | | |
|---|---|---|
| *H02K 11/33* | (2016.01) | |
| *F24F 11/75* | (2018.01) | |
| *F24F 11/77* | (2018.01) | |
| *H02K 1/14* | (2006.01) | |
| *H02K 1/18* | (2006.01) | |
| *H02K 1/2786* | (2022.01) | |
| *H02K 1/30* | (2006.01) | |
| *H02K 5/18* | (2006.01) | |
| *H02P 6/20* | (2016.01) | |

(52) U.S. Cl.
CPC ............. *H02K 11/33* (2016.01); *F24F 11/75* (2018.01); *F24F 11/77* (2018.01); *H02K 1/148* (2013.01); *H02K 1/187* (2013.01); *H02K 1/2786* (2013.01); *H02K 1/30* (2013.01); *H02K 5/18* (2013.01); *H02P 6/20* (2013.01)

(58) Field of Classification Search
CPC .. F24F 11/04; F24F 11/77; F24F 11/75; H02P 6/20; H02K 5/18; H02K 2213/03; H02K 11/33; H02K 1/187; H02K 1/148; H02K 1/30; H02K 1/2786; F04D 27/004; F04D 25/166

See application file for complete search history.

(56) References Cited

U.S. PATENT DOCUMENTS

| | | | |
|---|---|---|---|
| 4,609,346 A | 9/1986 | Siccardi | |
| 4,700,887 A | 10/1987 | Timmons | |
| 4,773,471 A | 9/1988 | Grant et al. | |
| 4,806,833 A | 2/1989 | Young | |
| 4,978,896 A | 12/1990 | Shah | |
| 5,019,757 A | 5/1991 | Beifus | |
| 5,327,064 A | 7/1994 | Arakawa et al. | |
| 5,736,823 A | 4/1998 | Nordby et al. | |
| 6,147,465 A * | 11/2000 | Hollenbeck | H02P 6/20 318/400.08 |
| 6,190,140 B1 | 2/2001 | Matson | |
| 6,386,460 B2 | 5/2002 | Riley et al. | |
| 6,481,635 B2 | 11/2002 | Riley et al. | |
| 7,244,106 B2 | 7/2007 | Kallman et al. | |
| 7,657,161 B2 | 2/2010 | Jeung | |
| 9,903,380 B2 | 2/2018 | Sun et al. | |
| 2003/0042860 A1* | 3/2003 | Sulfstede | F04D 27/004 318/432 |
| 2003/0130815 A1* | 7/2003 | Cohen | A01K 1/031 702/140 |
| 2004/0264125 A1* | 12/2004 | Cheng | G06F 1/206 361/679.48 |
| 2006/0286924 A1 | 12/2006 | Milana | |
| 2007/0151068 A1* | 7/2007 | Zahuranec | A47L 9/19 15/319 |
| 2007/0152613 A1* | 7/2007 | Mullin | F04D 27/004 318/432 |
| 2010/0253249 A1* | 10/2010 | Gutmann | F04D 27/004 318/3 |
| 2010/0256821 A1 | 10/2010 | Jeung et al. | |

FOREIGN PATENT DOCUMENTS

| | | | |
|---|---|---|---|
| EP | 0 627 806 A2 | 12/1994 | |
| EP | 0 672 344 A1 | 9/1995 | |
| EP | 1 099 912 A1 | 5/2001 | |
| FR | 2 533 085 A1 | 3/1984 | |
| FR | 2 748 090 A1 | 10/1997 | |
| FR | 2 783 307 A1 | 3/2000 | |
| JP | 2-231940 A | 9/1990 | |
| JP | 2004027921 A | * | 1/2004 |
| JP | 2004190616 A | * | 7/2004 |
| KR | 100781140 B1 | * | 11/2007 |

OTHER PUBLICATIONS

English machine translation of description for JP2004190616A dated 2004 (Year: 2004).*
English Abstractor KR100781140B1 dated 2007 (Year: 2007).*
Ametek (Technical Product Brochure, 2000) (Year: 2000).*
Human translation of JP2004190616A (Year: 2004).*
Glen J. Arnold, Michael A. Veenhuizen, "Livestock Housing Ventilation Fan Performance and Management," Cooperative Extension Service, Ohio State University, Fact Sheet AEX-111-94, 1994.
Ventilation Principles, Chapter 7, Pennsylvania State University, 1995.
Ametek Rotron Product Brochure, "We're Big on Brushless-Brushless DC Motors, Blowers, Controllers," 2000.
Fifth report of the BVAAWF/FRAME/RSPCA/UFAW Joint Working Group on Refinement, "Laboratory Birds: Refinements in Husbandry and Procedures," 2001.
Ebmpapst, "Energy-Saving Giants, Examples & Design Comparisons," Apr. 2004.
Ebmpapst, "Worlds in Motion; Closed-Loop Flow Control Using Instrumented Inlet Nozzles," Aug. 2005.
Canada Plan Service, Plan M-9705, "Selecting Fans for Livestock Buildings," Feb. 5, 2007.
Poultry Production Systems, Chore-Time Brock International, Chore-Time News, Newsbyte-Variable Speeds Fans, 2008.
Poultry Production Systems, Chore-Time Brock International, Chore-Time Brochure, Fans and Shutters, May 2008.
Joe Roy, "Yesterday's Efficiency is Blown Away by Today's Technology," Hearst EEM, Nov. 3, 2008.
Life, "Choosing Fans for Livestock and Poultry Ventilation," Iowa State University, Nov. 2009.

* cited by examiner

FAN FOR USE IN AGRICULTURE

CROSS REFERENCES TO RELATED APPLICATIONS

This application claims the benefit of U.S. Provisional Application No. 61/175,970, filed May 6, 2009, which is hereby incorporated herein by reference in its entirety, except that the present application supersedes any portion of the above referenced application which is inconsistent with the present application.

STATEMENT REGARDING FEDERALLY SPONSORED RESEARCH OR DEVELOPMENT

Not Applicable.

BACKGROUND OF THE INVENTION

(1) Field of the Invention

The present invention relates to a fan for use in agriculture which includes a brushless direct current (BLDC) motor. In particular, the present invention relates to a fan for use in livestock confinement buildings which has a propeller size of between about 36 inches (914 mm) and 84 inches (2134 mm) and which uses a BLDC motor with an electronic control system to optimize the revolutions per minute (rpm), airflow and efficiency of the fan during the various growing stages of the livestock or animals which is needed to maximize the growth rate of the animals and optimize the efficiency of the fan and ventilation system.

In the past, ventilation systems for livestock confinement buildings used induction motors and controlled ventilation by either turning "on" or "off" some or all of the fans. However, this method often created peaks and valleys in the ventilation of the building where the fans were either "on" or "off". In addition, in the past airflow rates in the livestock confinement building would vary due to building pressure, wind effects, clogged inlets and other conditions, these conditions affected the ability of the fans to move air. This created periods where the environment and airflow rate in the livestock confinement building was not optimized for the maximum growth of the livestock in the livestock confinement building. In addition, in the past, with fans having induction motors, to make large changes in the airflow of a fan, the motor and/or drive system of the fan was replaced. Thus, there was no easy way to change the speed or airflow of the fans without changing or adding equipment. There was also little ability to operate the fans at peak efficiency while maintaining optimal growth conditions for the livestock in the livestock confinement buildings. There remains a need for a fan for use in livestock confinement buildings which uses a BLDC motor and an electronic control system so that the fan can be operated in a variety of modes and can be easily switched between modes to maximize the efficiency of the fans while optimizing the growing environment of the buildings for the livestock. The substance and advantages of the present invention will become increasingly apparent by reference to the following drawings and the description.

BRIEF SUMMARY OF THE INVENTION

A fan for use in agriculture which has a BLDC motor. The fan includes a propeller, a center hub, a BLDC motor, a main strut and a control system. The center hub is a bearing unit which has a main shaft rotatably attached to a mounting shaft. The stator of the BLDC motor is fixably mounted on the main strut. The rotor of the BLDC motor as well as the propeller are mounted to the mounting shaft of the center hub. The bearings of the center hub allow the rotor and propeller to rotate while the stator remains stationary. The use of the main strut supports and locates the motor and its parts and allows for mounting of the fan in existing fan housings.

The control system for the fan controls the speed of the BLDC motor and the fan which controls the airflow rate of the fan. The control system includes at least one (1) microprocessor having programs for controlling the operation of the fan. In one (1) embodiment, the control system has at least two (2) microprocessors. The first microprocessor is preprogrammed to run the standard operations of the motor such as turning the BLDC motor "on" and "off". The second microprocessor is programmable and includes customized programs to control the speed of the BLDC motor. In one (1) embodiment, the control system has jumpers which determine which customized programs are downloaded from the EEPROMs to the second microprocessor. In one (1) embodiment, the control system also includes manual controls. In one (1) embodiment, the control system includes a variable voltage input. In this embodiment, a voltage between 0 to 10V DC is input into a variable voltage input to vary the speed of the BLDC motor. In another embodiment, the control system has a logic signal input. In this embodiment, a 120V AC logic signal is inputted into the logic signal input to switch the BLDC motor from one (1) speed or operating mode to a different speed or operating mode. The logic signal input acts as a switch. In one (1) embodiment, the control system can be preprogrammed to operate the fan in two (2) modes. The first mode is the high efficiency mode where the speed of the fan varies and thus the airflow rate (CFM) produced by the fan varies to maintain the highest operating efficiency. The second mode is the maximum performance mode where the speed of the fan remains constant. In another embodiment, the fan can operate in four (4) different modes. The first mode is the constant speed mode which operates the BLDC motor at a constant speed. The second mode is the constant airflow rate where the speed of the propeller is varied as necessary to maintain the desired airflow rate under differing pressures. The fan can also operate in a third, constant torque mode or a fourth, constant or maximum efficiency mode.

A plurality of the fans can be used in a ventilation system for a livestock confinement building. The ventilation system provides ventilation to the livestock confinement building to optimize the environmental conditions in the livestock confinement building to maximize the growth of the livestock. The speed of the fans in the ventilation system can be adjusted to optimize the environmental conditions in the livestock confinement building. The fans can run at different speeds to achieve the correct ventilation and airflow rate in the livestock confinement building. In one (1) embodiment, one or more of the fans in the ventilation system can be "on" or "off" or operating at half speed or operating at any speed from "off" to full speed. The ability to separately control the speeds of the fans in the ventilation system allows for better control of the airflow rate in the livestock confinement building and prevents peaks and valleys in the airflow rate. The ability to individually adjust the speeds of the various fans of the ventilation system enables a user to achieve the desired airflow in the livestock confinement building while maximizing the efficiency of the ventilation system.

The present invention relates to a fan for use in agriculture which comprises a main strut, a center hub having a mounting shaft rotatably connected to a main shaft with the main shaft fixably mounted on the main strut, a BLDC motor having a rotor and a stator with the stator fixably mounted on main strut and the rotor fixably mounted on the mounting shaft of the center hub, a propeller fixably mounted on the mounting shaft of the center hub adjacent the rotor on a side opposite the stator, and a control system connected to the BLDC motor for controlling the operation of the BLDC motor.

Further, the present invention relates to a method for providing a constant airflow rate in a livestock confinement building which comprises the steps of providing a plurality of BLDC fans in the livestock confinement building, and controlling a speed of each of the fans to control an airflow rate of each fan to maintain a constant airflow rate in the livestock confinement building.

Still further, the present invention relates to a process for maximizing growth of livestock in a livestock confinement building, which includes the steps of providing a plurality of BLDC fans in the livestock confinement building, monitoring environmental conditions in the livestock confinement building, and controlling an air flow rate in the livestock confinement building to maintain predetermined environment conditions by controlling a speed of each of the fans to maintain a desired air flow rate in the livestock confinement building which maximizes the growth of the livestock.

Further still, the present invention relates to a ventilation system for a livestock confinement building, which comprises a plurality of fans having a BLDC motor and having a propeller with a size of between approximately 36 inches (914 mm) to 84 inches (2134 mm), and a control system for controlling a speed of the fans.

The substance and advantages of the present invention will become increasingly apparent by reference to the following drawings and the description.

DETAILED DESCRIPTION OF THE INVENTION

A fan 10 for use in ventilation in agriculture such as for ventilation of livestock confinement buildings. Livestock can include chickens, cows, pigs, etc. The ventilation system for a livestock confinement building can include a plurality of fans 10. The fans 10 can operate independently or together as part of the ventilation system for the livestock confinement building. The ventilation system controls the environment of the livestock confinement building to optimize the growth of the livestock in the livestock containment building.

Figure 1:
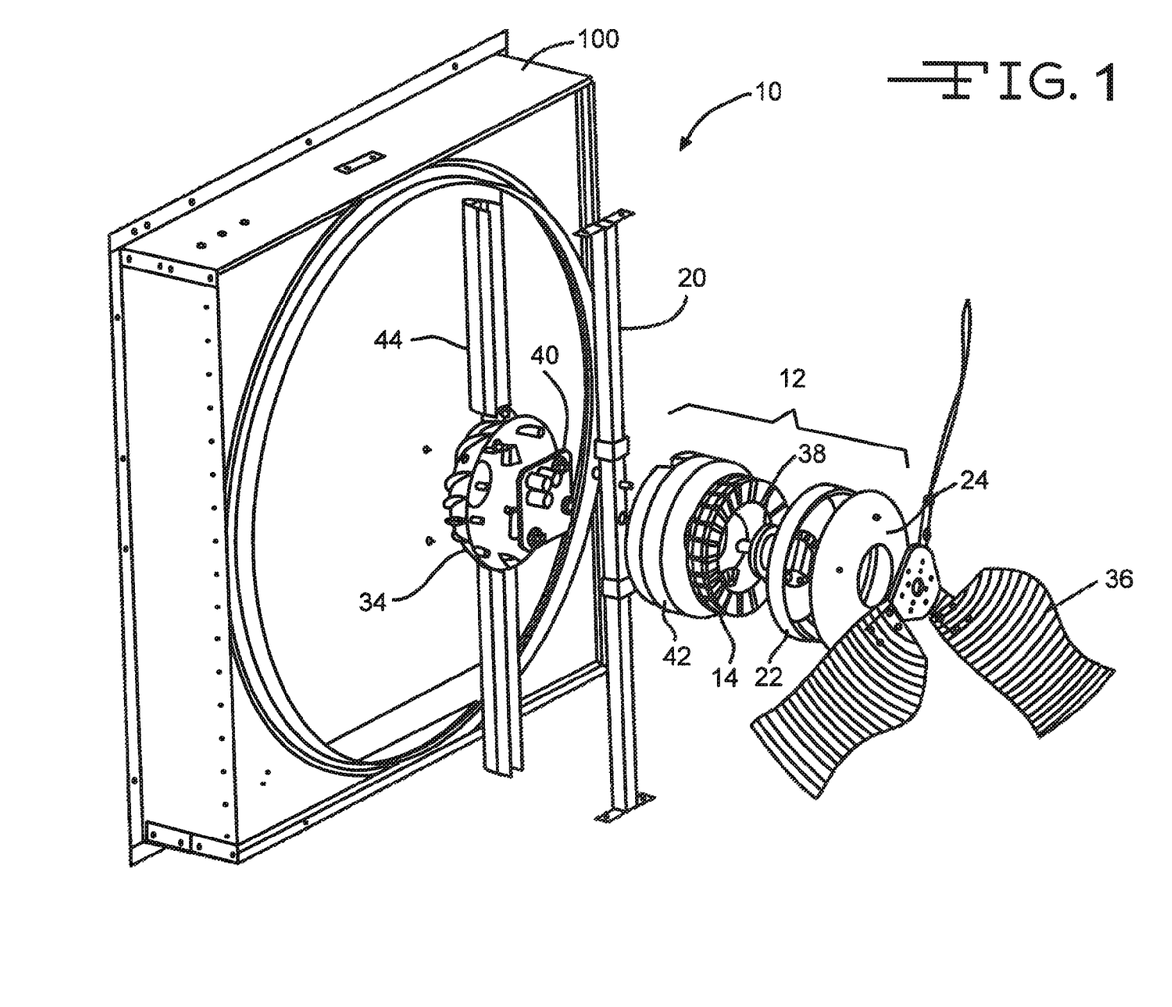
FIG. 1 is an exploded view of the fan 10 of the present invention showing the propeller 36, the rotor cover 24, the rotor 22, the center hub 38, the stator 14, the control system 40, the heat sink cover 34, and the main strut 20 for mounting the motor 12 to the fan housing 100.
Figure 2:
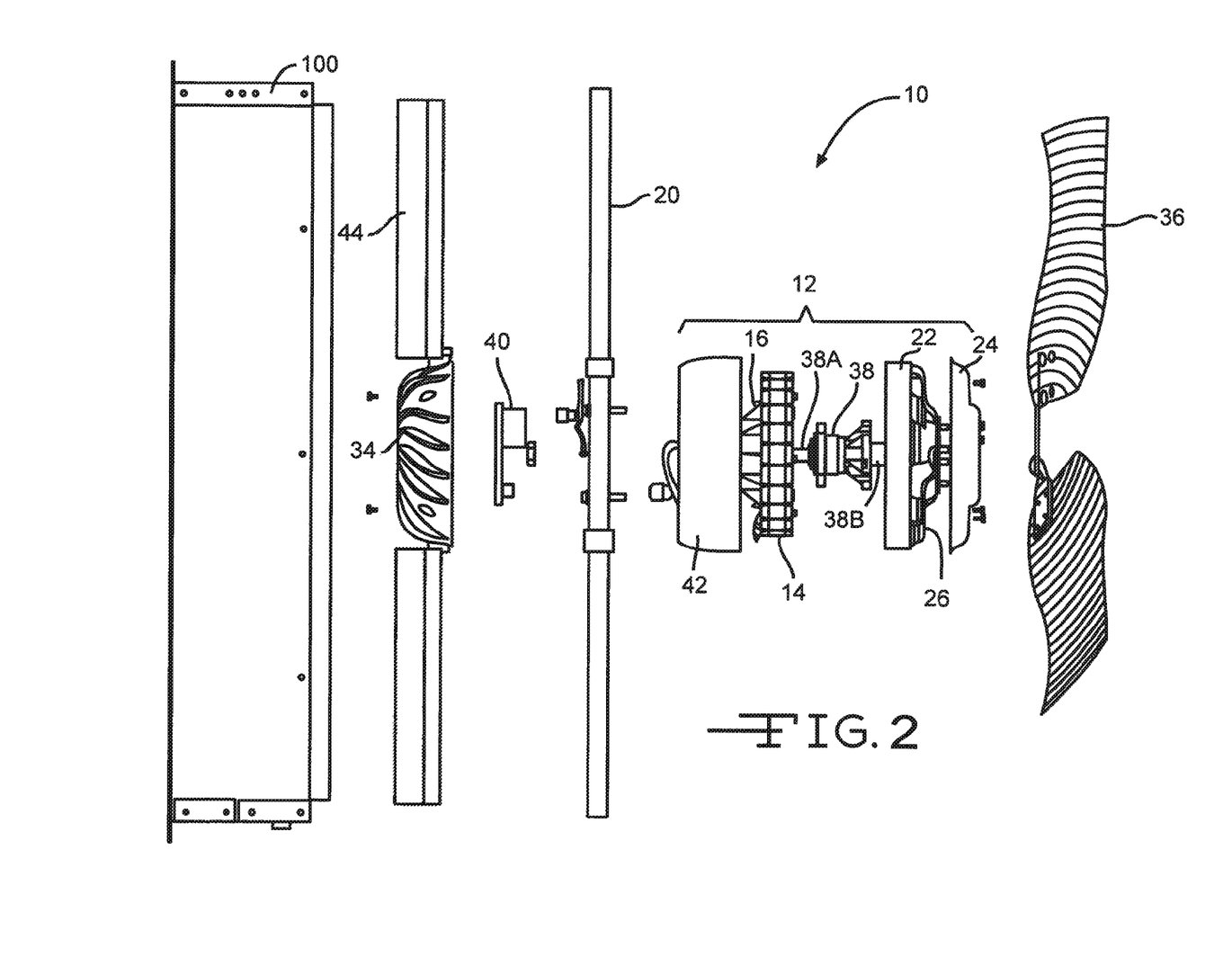
FIG. 2 is a side exploded view of the fan 10 of the present invention.

The fan 10 includes a propeller 36 and a BLDC motor 12 (FIGS. 1 and 2). In one (1) embodiment, the fan 10 includes a main strut 20 which supports and locates the motor 12 and the various components of the fan 10 and allows the fan 10 to be mounted in a fan housing 100. In one (1) embodiment, the main strut 20 enables the fan 10 to be easily mounted in existing fan housing to replace an existing fan. The fan 10 is a direct drive, axial fan with the propeller 36 mounted directly to the motor 12. The use of direct drive eliminates the need to repair and replace belts which limits the downtime of the fan 10 and reduces the operating cost. In one (1) embodiment, the propeller 36 has three (3) blades. However, it is understood that any fan propeller well known in the art can be used. It is intended that the fan 10 can be retrofit into existing fan housings used for existing fans. In one (1) embodiment, the fan 10 is an axial exhaust, inlet or recirculation fan having a diameter of between approximately 36 inches (914 mm) and 84 inches (2134 mm). In one (1) embodiment, the similar sized BLDC motors 12 are used for all fans 10 having a size of between approximately 36 inches (914 mm) and 84 inches (2134 mm).

The fan 10 has a center hub 38. The center hub 38 has a main shaft 38A and a mounting shaft 38B rotatably connected to the main shaft 38A (FIG. 2). The main shaft 38A of the center hub 38 is fixably mounted through the main strut 20 of the fan 10. The center hub 38 has bearings to allow the mounting shaft 38B to rotate while the main shaft 38A remains stationary. In one (1) embodiment, the center hub 38 is similar to center hubs well known for use in ventilation fans for agricultural use. In one (1) embodiment, the propeller 36 is mounted on the mounting shaft 38A of the center hub 38.

The BLDC motor 12 includes a stator 14 and a rotor 22. In one (1) embodiment, the BLDC motor 12 is a 3-phase motor having 16 magnetic poles and 24 electrical poles. In one (1) embodiment, the BLDC motor 12 is an outer-rotor motor having the rotor 22 mounted outside of and around the stator 14. The rotor 22 includes a rotor hub 26, a flux ring 28 and magnets 30. The rotor 22 is covered by a rotor cover 24. In one (1) embodiment, the rotor cover 24 is mounted to the rotor hub 26. In one (1) embodiment, the rotor hub 26 has an outer ring connected to a center portion. The magnets 30 are mounted on the inner surface of the outer ring of the rotor hub 26 and are spaced apart around the circumference of the inner surface of the outer ring. In one (1) embodiment, the magnets 30 are constructed of ceramic or neodymium magnetic material. The rotor hub 26 is mounted to the mounting shaft 38B of the center hub 38. In one (1) embodiment, the propeller 36 is mounted on the rotor hub 26.

Figure 6:
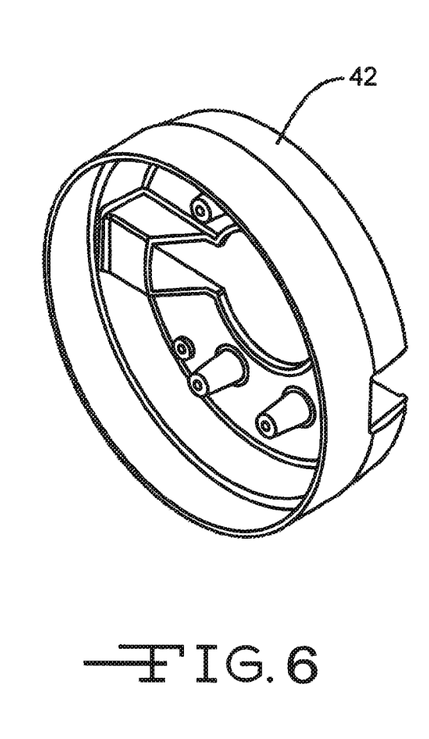
FIG. 6 is a perspective view of the main housing 42 for the BLDC motor 12.
Figure 7:
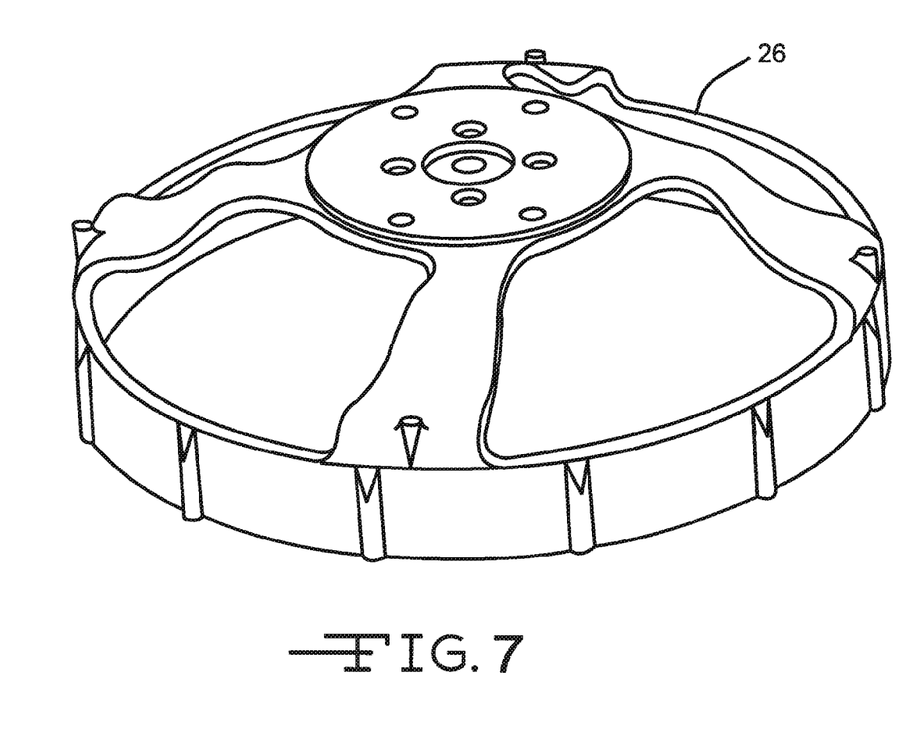
FIG. 7 is an isometric view of the rotor hub 26 for the BLDC motor 12.
Figure 8:
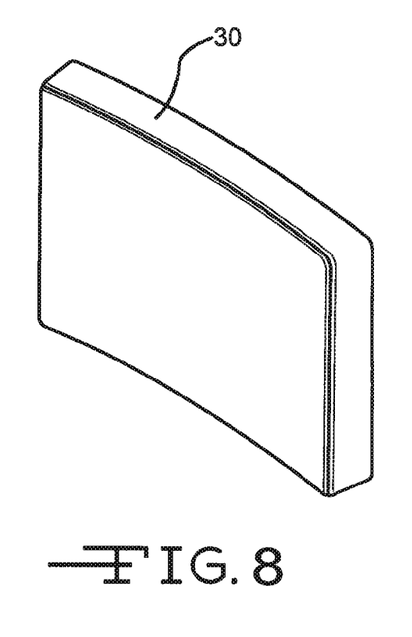
FIG. 8 is an isometric view of the magnet 30.
Figure 9:
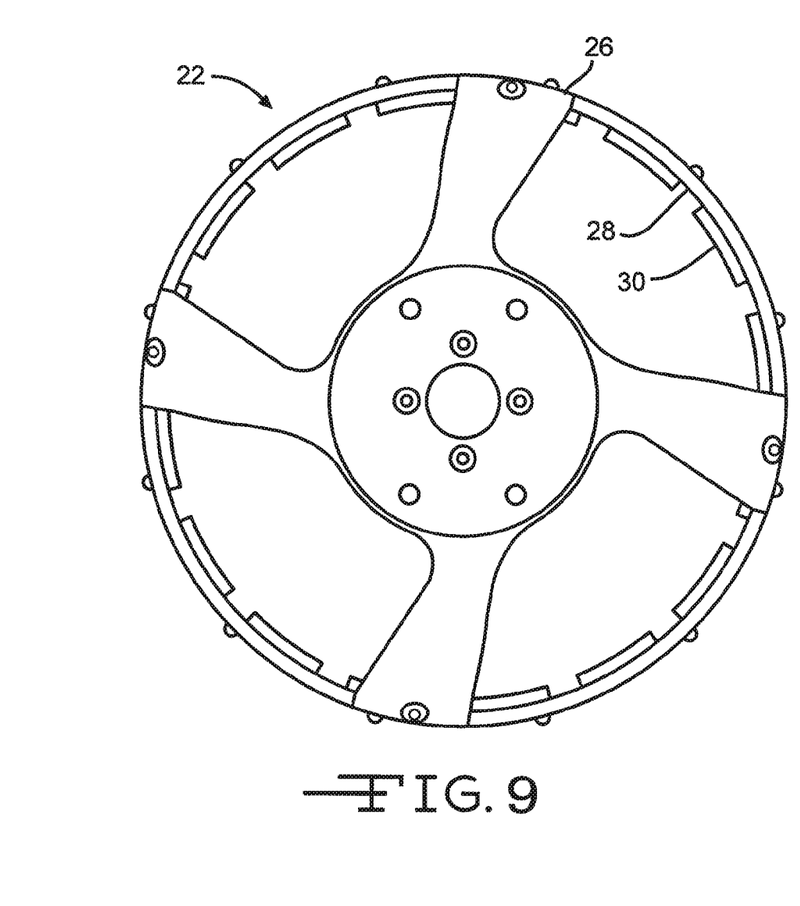
FIG. 9 is a top view of the rotor hub 22 showing the rotor hub 26, the flux ring 28 and magnets 30.
Figures 10, 11:
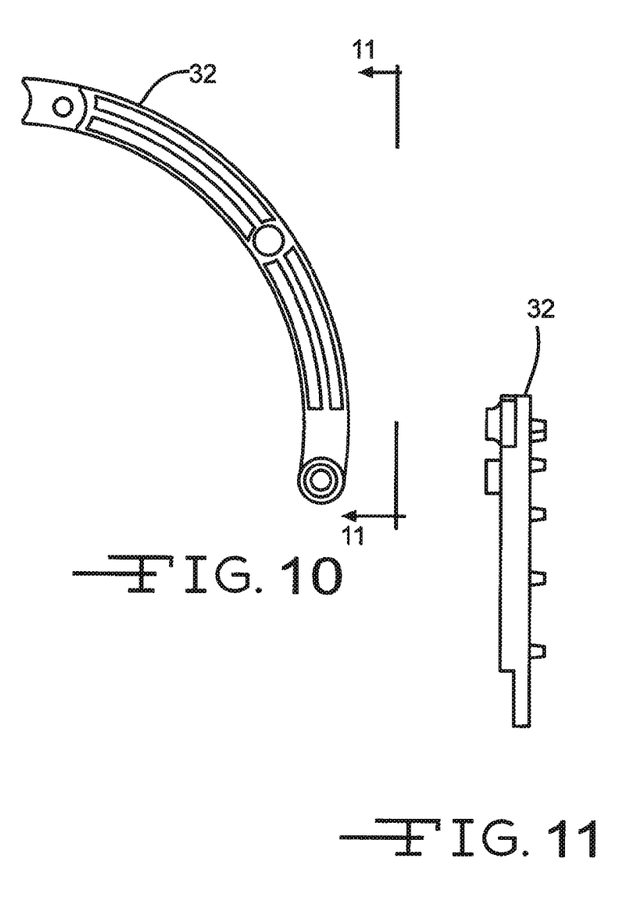
FIG. 10 is a top view of one (1) section of the lamination retainer 32 for the stator 14.
FIG. 11 is a right side view along the line 11-11 of FIG. 10.
Figure 12:
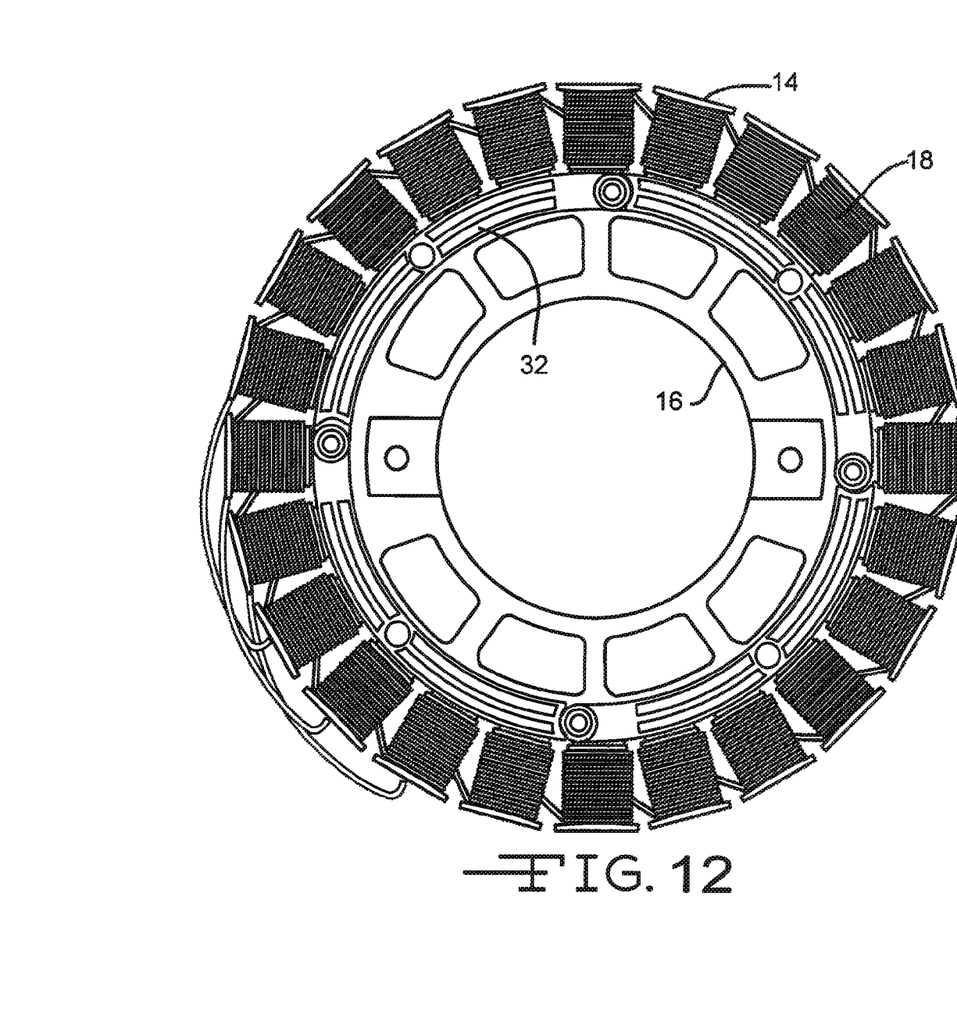
FIG. 12 is a top view of the stator 14 showing the stator mount 16, the single lamination stack assemblies 18 mounted around the circumference of the stator mount 16, and the lamination retainer 32 for securing the single lamination stack assemblies 18 to the stator mount 16.
Figure 13:
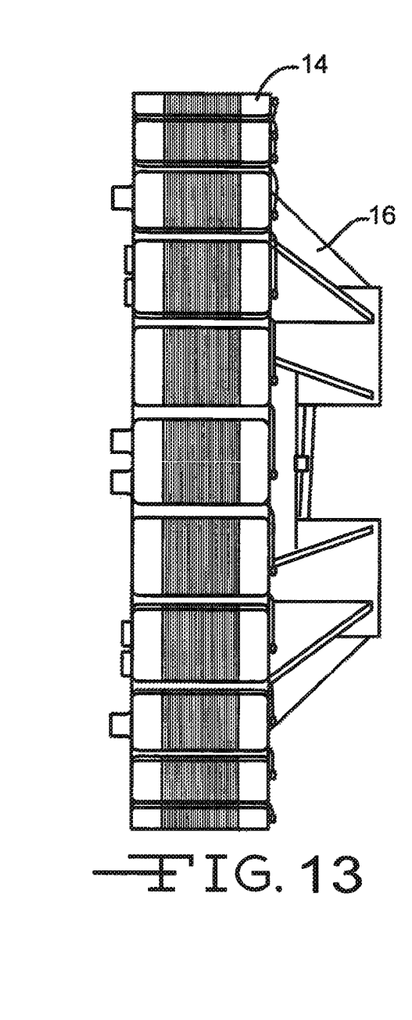
FIG. 13 is a side view of the stator 14 and stator mount 16.

The stator 14 includes a stator mount 16, single lamination stack assemblies 18 mounted on the stator mount 16 and a lamination retainer 32 for securing the single lamination stack assemblies 18 on the stator mount 16 (FIGS. 12 and 13). In one (1) embodiment, the stator 14 has a low profile with pancake shaped lamination stack assemblies 18 having a height of between approximately 1.00 to 2.50 inches (25.4 mm to 63.5 mm). In one (1) embodiment, the lamination stack assemblies 18 have a height of approximately 1.25 inches (31.75 mm). In one (1) embodiment, the stator 14 has an outer diameter of between approximately 10 inches to 14 inches (254 mm to 356 mm). In one (1) embodiment, the rotor hub 26 has an inner diameter of between approximately 11 inches and 15 inches (279 mm to 381 mm). In one (1) embodiment for a 13 inch (330 mm) BLDC motor 12, the flux ring 28 of the rotor 22 has an inner diameter of 12.5 inches (318 mm) and an outer diameter of 12.8 inches (326 mm). The stator 14 is fixably mounted on the main strut 20. A main housing 42 is optionally provided to cover the stator 14 (FIG. 6). In one (1) embodiment, the main housing 42 is mounted on the main strut 20. In one (1) embodiment, the rotor 22 is covered by the main housing 42 except that the rotor hub 26 of the rotor 22 extends slightly beyond the main housing 42 in a direction opposite the main strut 20. The main housing 42 and the rotor cover 24 essentially completely enclose the rotor 22 and the stator 14 of the motor 12.

Figure 2A:
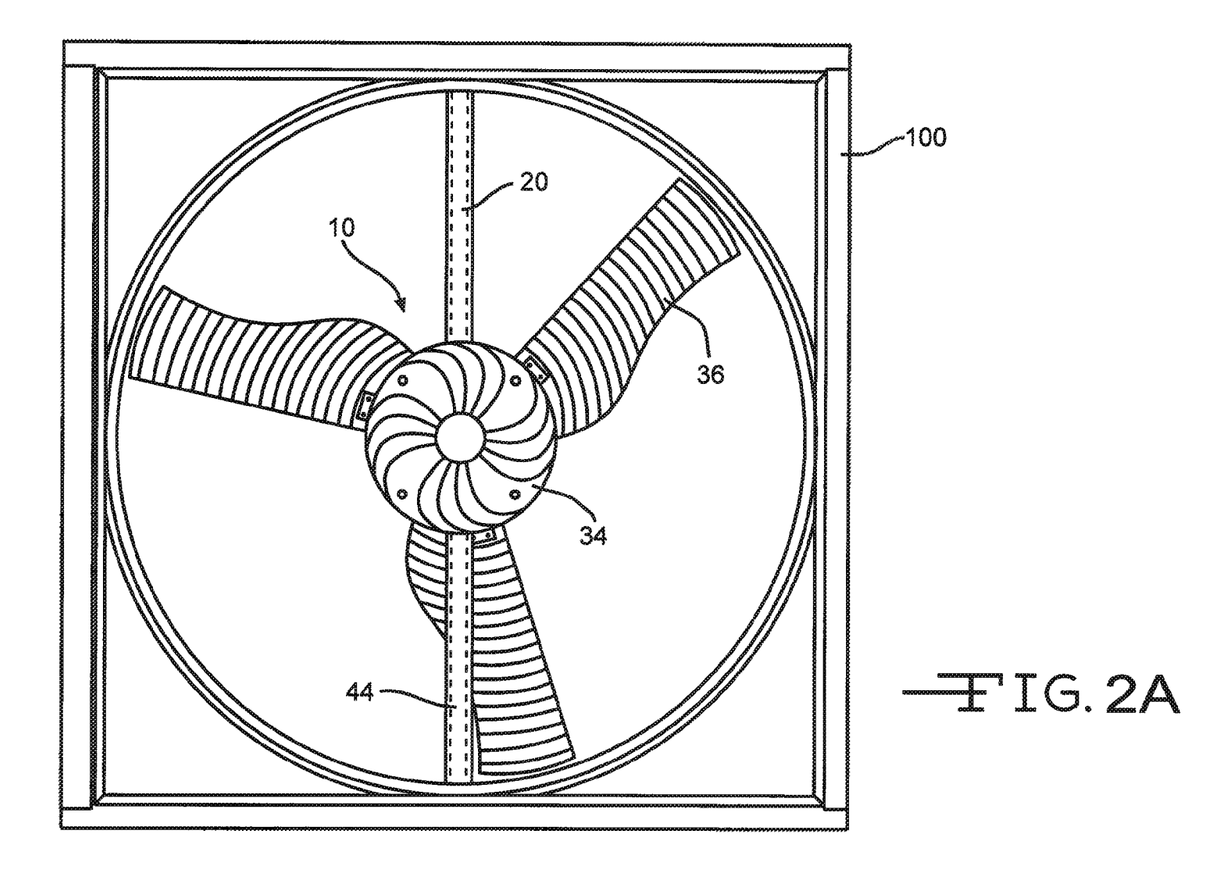
FIG. 2A is an end view of the fan 10 showing the heat sink cover 34.
Figure 3:
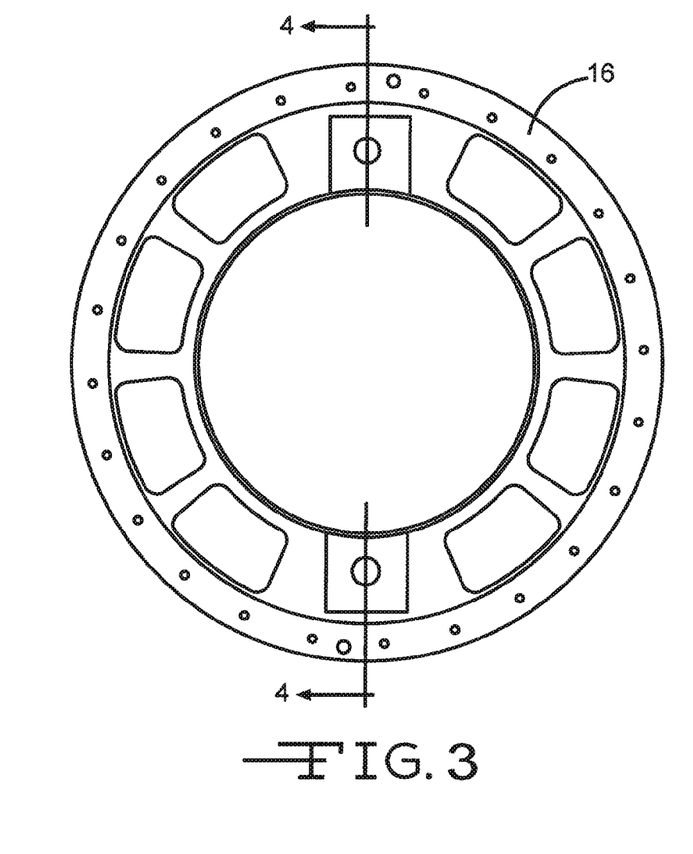
FIG. 3 is a top view of the stator mount 16 for the single lamination stack assemblies 18 of the BLDC motor 12 of the fan 10.
Figure 4:
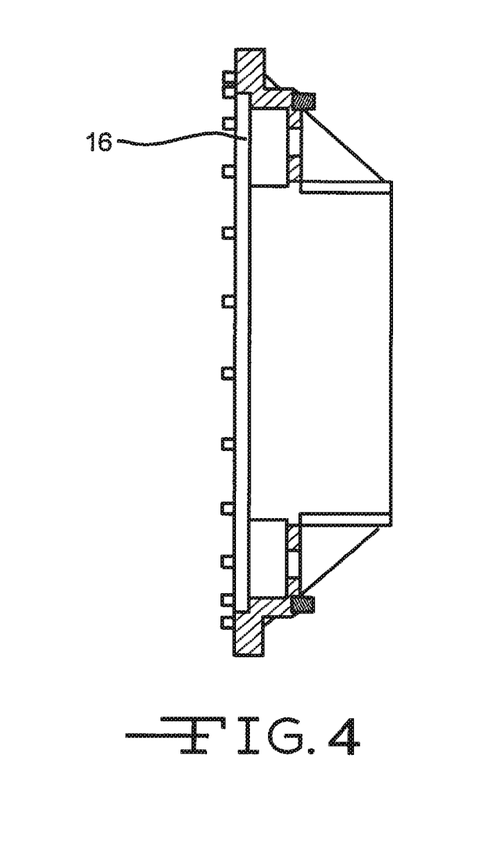
FIG. 4 is a cross-sectional view along the line 4-4 of FIG. 3.
Figure 5:
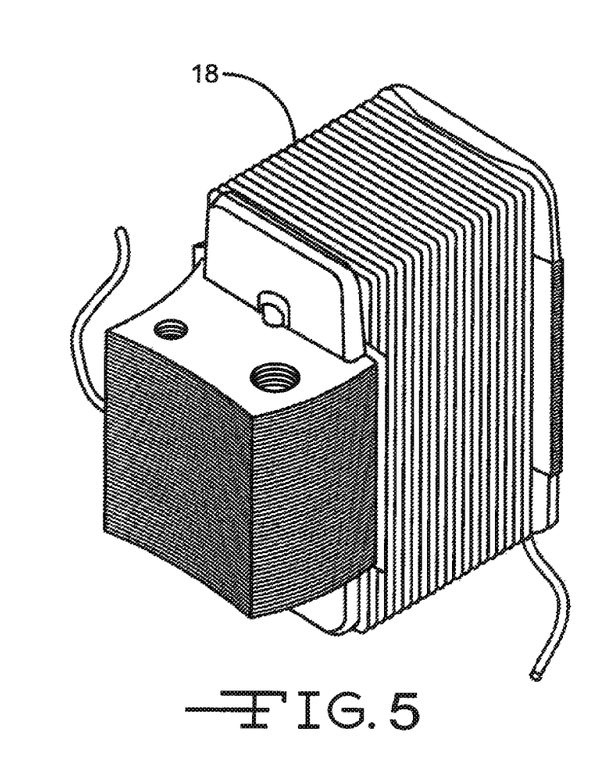
FIG. 5 is an isometric view of the wound, single lamination stack assembly 18.

A heat sink cover 34 is mounted to the main strut 20 of the fan 10 on the inlet side of the fan 10 opposite the propeller 36, rotor 22 and stator 14 (FIG. 2A). In one (1) embodiment, the heat sink cover 34 acts as a cover for the motor 12 and prevents debris from entering the motor 12. The aerodynamic shape of the heat sink cover 34 reduces the interference in air flowing over the motor 12. In one (1) embodiment, an aerodynamic cover 44 is provided over the main strut 20 to reduce the disruption of air flow caused by the main strut 20.

The BLDC motor 12 is controlled by an electronic control system 40. In one (1) embodiment, the control system 40 is structurally similar to those well known in the art for controlling BLDC motors and includes one or more microprocessors, a rectification circuit that converts incoming AC line voltage to DC and conditions the incoming power, a final IGBT (Internal Gate Bi-Polar Transistor) module that is essentially a high-power, high speed, low resistance solid state switching device which turns the coils of the motor 12 "on" and "off". In one (1) embodiment, the control system 40 has two (2) mircoprocessors. The first microprocessor includes the standard operating programming for controlling standard operations of the motor 12. The second microprocessor allows for using customized programs for customizing the operation of the motor 12. In one (1) embodiment, the control system 40 has an EEPROM which has a plurality of different programs which change the operation of the fan 10. In one (1) embodiment, the control system 40 is provided with jumpers. In one (1) embodiment, the jumpers are wires. The connection or removal of jumpers in the control system 40 determines which program from the EEPROM will be downloaded into the second microprocessor which determines how the fan 10 will operate. Each jumper corresponds to a different program in the EEPROM. The jumpers enable a user to select the fixed speed of the fan 10. The jumpers enable a user to change the peak horsepower and RPM of the fan 10 while using the same motor 12. In one (1) embodiment, the control system 40 for operating the fan 10 is mounted on the fan housing 100 of the fan 10. In another embodiment, the control system 40 is mounted adjacent the main strut 20 in the heat sink cover 34 adjacent the inlet of the fan 10. The shape of the heat sink cover 34 and the cooling fins on the outer surface of the heat sink cover 34 help to keep the electronic control system 40 cool.

By electronically controlling the airflow produced by the fan 10 or ventilation system having a plurality of fans (such as by controlling the airflow of each individual fan or by shutting off unnecessary fans), each fan 10 can be used most efficiently based on the growing stages of the livestock in the livestock confinement building. The control system 40 can be specifically designed for each livestock confinement building by mapping the required airflow to any livestock confinement building. The control system 40 can be adjusted based on the various stages of growth of the livestock in a livestock confinement building. Some of the variables that can be considered when programming the control system 40 so that the fan 10 operates efficiently are building temperature, air velocity in the building, livestock water consumption, livestock weight and feed supply rate. In one (1) embodiment, another variable which is considered when programming the fan 10 is ventilation rate. Ventilation rate is airflow per animal. For example, in a poultry house, ventilation rate would be CFM/bird. Another variable which may be considered is humidity in the building.

In one (1) embodiment, the speed of the fan 10 can be adjusted without reconfiguring the control system 40 or reprogramming the microprocessor of the control system 40. In one (1) embodiment, the control system has a variable voltage input and a user can input an analog signal between 0-10V DC to the variable voltage input. The speed of the fan 10 can be continually adjusted based on the amplitude of the analog signal. In one (1) embodiment, an input of 10V DC corresponds to a speed of approximately half maximum speed and an input of 0V DC corresponds to a speed of approximately maximum speed. In one (1) embodiment, the control system 40 is preprogrammed to operate the fan 10 in two (2) modes. The fan 10 can be run in a high efficiency mode or a maximum performance mode. In the high efficiency mode, the speed of the fan 10 varies and thus the airflow rate (CFM) produced by the fan 10 varies. However, the energy consumed (power input, watt) by the fan 10 remains relatively constant. In the maximum performance mode, the airflow rate remains essentially constant. However, energy consumption of the fan 10 varies and thus the fan 10 tends to be less efficient in maximum performance mode. In one (1) embodiment, the switching between modes is automatic based on variables preselected by the user. In another embodiment, the user manually selects in which mode the fan 10 operates such as by flipping a switch. In one (1) embodiment, the control system 40 includes logical signal input and the mode of the fan 10 can be changed by inputting a signal to the logic signal input. In one (1) embodiment, the signal is a 120V AC "logic" signal. In one (1) embodiment, the input of the 120V AC "logic" signal switches the fan 10 from maximum performance mode to high efficiency mode. In one (1) embodiment, the 120V AC "logic" signal is used to switch the fan 10 from full airflow rate to half airflow rate.

In one (1) embodiment, the fan 10 is able to operate in four (4) different modes. In the first, constant speed mode, the propeller 36 rotates at a constant speed (RPM). The control system 40 keeps the speed of the propeller 36 constant by adjusting the power to the motor 12 based on monitored conditions. The control system 40 receives feedback from the motor 12 and adjusts the motor 12 to achieve the constant speed. In a second, constant airflow mode, the control system 40 adjusts the speed of the propeller 36 to achieve a constant airflow rate. The control system 40 receives feedback from the motor 12 and adjusts the speed of the propeller 36 to achieve the predetermined airflow rate. Thus, as the static pressure in the building changes, the speed of the fan 10 is automatically adjusted so that the airflow rate remains constant. The control system 40 can also be used to maintain the fan 10 in a third, constant torque mode or a fourth, constant or maximum efficiency mode. The control system 40 is a sensorless control system which receives internal feedback from the motor 12 and which does not use any external feedback sensors. The control system 40 is a closed loop operation. In this embodiment, the motor 12 uses back-EMF to detect the position of the rotor 22 of the motor 12. Back-EMF and zero crossing detection are used to determine the direction of the rotation of the motor 12 and to detect the speed of the motor 12.

In one (1) embodiment, where the fan 10 is part of a ventilation system having a plurality of fans 10, each control system 40 for each fan 10 is programmed based on the results for the overall ventilation system. For example, for some early stages of livestock growth in a livestock confinement building, the airflow rate which is needed is less than the maximum airflow rate which can be provided by the ventilation system. In this instance, the control systems 40 for some of the fans 10 will shut the fans 10 down while the control systems 40 for other fans in the ventilation system will continue to run the fans 10 at full speed. In another embodiment, to reduce the airflow rate of the ventilation system, the control systems 40 for all of the fans 10 are programmed to run some or all of the fans 10 at a reduced speed. In one (1) embodiment, operating multiple fans 10 at a reduced speed to obtain the desired airflow rate is more efficient than operating fewer fans 10 at full speed to obtain the same air flow rate. In one (1) embodiment, the ventilation system is operated by a central control system which controls each of the control systems 40 for each of the individual fans 10 of the ventilation system. In another embodiment, the control system 40 for each fan 10 of the ventilation system is preprogrammed to provide a set airflow rate at set times based on the stages of growth of the livestock in the livestock confinement building. In one (1) embodiment, the fans 10 are controlled such that the environment conditions in the livestock confinement building allows for the maximum growth rate for less feed. Thus, the ventilation system is used to optimize the feed conversion rate for the livestock in the livestock confinement building. In one (1) embodiment, the feed conversion rate is maximized by leveling out the ventilation or airflow rate provided by the fans 10 so that the environmental conditions in the livestock confinement building remain at a steady state without dramatic changes. The environmental conditions are adjusted as necessary to provide optimum feed conversion rate throughout the growing cycle of the livestock. In one (1) embodiment, the control system 40 for the fans 10 enable the fans 10 to provide a constant airflow rate in the livestock confinement building. The fans 10 of the ventilation system operate at a range of speeds appropriate for livestock ventilation systems. In one (1) embodiment, the fan 10 operates at a speed of less than 650 RPM. In one (1) embodiment, the motor 12 provides a torque of greater than 10 ft-lbs. The motor 12 is able to operate over a wide range of supply voltages. Thus, the difficulties associated with operating fans in facilities having older wiring or faulty wiring systems are reduced. The fan 10 with the BLDC motor 12 is able to operate in a variety of environmental conditions including extreme high and low temperatures. In one (1) embodiment, the fan 10 is able to operate in ambient temperatures from approximately −30° C. to 55° C. (−22° F. to 131° F.).

In one (1) embodiment, the fan 10 uses a soft-start to reduce inrush effects on the electrical supply line due to the starting of all the fans 10 in a building simultaneously. The fan 10 eases into operation by slowly providing a very low supply voltage to the motor 12 and then gradually increasing the voltage until the desired operating speed for the fan 10 is obtained. The use of a soft-start enables all the fans of a ventilation system for a building to be turned on simultaneously without overburdening the electrical supply line which allows a smaller, less expensive back-up generator to be used.

In one (1) embodiment, the control system 40 is programmed to automatically rotate the propeller 36 briefly in the backward direction when the fan 10 is shut down. When the propeller 36 is rotated in the backward direction, the movement of the propeller 36 moves air out of the inlet of the fan 10 which closes the damper on the outlet of the fan 10 to prevent conditioned air in the building from exiting the building.

Testing of the fan 10 of the present invention having the BLDC motor 12 compared to similarly sized fans using AC motors shows that the fan 10 of the present invention is more efficient than fans currently in use. Table 1 shows the fan efficiency of the fan 10 having a BLDC motor (Fan 1) as compared to a fan having a standard 1 horsepower single phase AC motor (Fan 2) where the fan speed is kept constant at a nominal speed of 460 rpm over a range of static pressures. For a static pressure of 0.0 inches, Fan 1 had an increased efficiency over Fan 2 of 18.3%. For a static pressure of 0.05 inches, Fan 1 had an increased efficiency over Fan 2 of 18.5%. For a static pressure of 0.10 inches, Fan 1 had an increased efficiency over Fan 2 of 15.2%. For a static pressure of 0.15 inches, Fan 1 had an increased efficiency over Fan 2 of 14.5%. For a static pressure of 0.20 inches, Fan 1 had an increased efficiency of 8.9% over Fan 2.

TABLE 1

| | | FAN 1 | | | FAN 2 | | |
|---|---|---|---|---|---|---|---|
| Motor Type | | BLDC | | | Standard, 1 Hp, single phase AC | | |
| Fan Speed RPM nominal | | 460 | | | 460 | | |
| Airflow Ratio | | 0.71 | | | 0.75 | | |
| | | Airflow Rate CFM | Power Input Watt | Fan Efficiency CFM/Watt | Airflow Rate CFM | Power Input Watt | Fan Efficiency CFM/Watt |
| Static | 0.0 | 27,400 | 919 | 29.8 | 27,000 | 1,072 | 25.2 |

TABLE 1-continued

|  |  | FAN 1 |  |  | FAN 2 |  |  |
|---|---|---|---|---|---|---|---|
| Pressure | 0.05 | 25,700 | 957 | 26.9 | 25,200 | 1,110 | 22.7 |
| Inches | 0.10 | 23,400 | 994 | 23.5 | 23,200 | 1,140 | 20.4 |
|  | 0.15 | 21,000 | 1,028 | 20.5 | 21,000 | 1,179 | 17.9 |
|  | 0.20 | 18,200 | 1,060 | 17.1 | 18,800 | 1,196 | 15.7 |

Table 2 shows the fan efficiency over a range of static pressures for the fan 10 of the present invention having the BLDC motor (Fan 1) and for a fan having a standard 1.5 horsepower, single phase, AC motor (Fan 2) where the fan speed is kept constant at a nominal speed of 510 rpm. For a static pressure of 0.0 inches, Fan 1 had an increased efficiency over Fan 2 of 19.1%. For a static pressure of 0.05 inches, Fan 1 had an increased efficiency over Fan 2 of 18.2%. For a static pressure of 0.10 inches, Fan 1 had an increased efficiency over Fan 2 of 15.8%. For a static pressure of 0.15 inches, Fan 1 had an increased efficiency over Fan 2 of 16.6%. For a static pressure of 0.20 inches, Fan 1 had an increased efficiency of 17.2% over Fan 2. Table 2 also shows that Fan 1 had an airflow ratio of 0.79 while Fan 2 had an airflow ratio of 0.78. Airflow ratio is the ability of the fan to maintain airflow rate as static pressure increases. The higher the airflow ratio the better the ability of the fan to maintain the airflow rate as the static pressure increases.

TABLE 2

|  |  | FAN 1 |  |  | FAN 2 |  |  |
|---|---|---|---|---|---|---|---|
| Motor Type |  | BLDC |  |  | Standard, 1.5 Hp, single phase AC |  |  |
| Fan Speed RPM nominal |  | 510 |  |  | 510 |  |  |
| Airflow Ratio |  | 0.79 |  |  | 0.78 |  |  |
|  |  | Airflow Rate CFM | Power Input Watt | Fan Efficiency CFM/Watt | Airflow Rate CFM | Power Input Watt | Fan Efficiency CFM/Watt |
| Static | 0.0 | 29,700 | 1,226 | 24.3 | 30,100 | 1,474 | 20.4 |
| Pressure | 0.05 | 28,300 | 1,281 | 22.1 | 28,500 | 1,526 | 18.7 |
| Inches | 0.10 | 26,400 | 1,333 | 19.8 | 26,900 | 1,579 | 17.1 |
|  | 0.15 | 23,400 | 1,381 | 17.6 | 24,600 | 1,627 | 15.1 |
|  | 0.20 | 22,300 | 1,420 | 15.7 | 22,300 | 1,663 | 13.4 |

Table 3 shows the fan efficiency over a range of static pressures for the fan 10 of the present invention having the BLDC motor (Fan 1) and a standard 1.5 horsepower, single phase, AC motor (Fan 2) where the power input is essentially the same for both fans. For a static pressure of 0.0 inches, Fan 1 had an increased efficiency over Fan 2 of 9.7%. For a static pressure of 0.05 inches, Fan 1 had an increased efficiency over Fan 2 of 11.3%. For a static pressure of 0.10 inches, Fan 1 had an increased efficiency over Fan 2 of 12.6%. For a static pressure of 0.15 inches, Fan 1 had an increased efficiency over Fan 2 of 16.6%. For a static pressure of 0.20 inches, Fan 1 had an increased efficiency of 23.0% over Fan 2.

TABLE 3

|  | FAN 1 | FAN 2 |
|---|---|---|
| Motor Type | BLDC | Standard, 1 Hp, single phase AC |
| Fan Speed RPM nominal | Varies | 365 |
| Airflow Ratio | 0.78 | 0.70 |

TABLE 3-continued

|  |  | FAN 1 |  |  | FAN 2 |  |  |
|---|---|---|---|---|---|---|---|
|  |  | Airflow Rate CFM | Power Input Watt | Fan Efficiency CFM/Watt | Airflow Rate CFM | Power Input Watt | Fan Efficiency CFM/Watt |
| Static | 0.0 | 22,600 | 997 | 22.7 | 20,600 | 995 | 20.7 |
| Pressure | 0.05 | 21,300 | 1,031 | 20.7 | 19,200 | 1,031 | 18.6 |
| inches | 0.10 | 19,900 | 1,054 | 18.8 | 17,700 | 1,059 | 16.7 |
|  | 0.15 | 18,300 | 1,084 | 16.9 | 15,700 | 1,082 | 14.5 |
|  | 0.20 | 16,600 | 1,106 | 15.0 | 13,400 | 1,100 | 12.2 |

Table 4 shows the fan efficiency of the fan 10 of the present invention having a BLDC motor over a range of static pressures where the airflow rate is constant at 22,500 CFM and 25,000 CFM. The fan 10 at both airflow rates has an airflow ratio of 1.0. The fan 10 is capable of attaining an airflow ratio of 1.0 or greater. No other large agricultural ventilation fan has this capability. This means that the fan 10 can be operated in such a manner as to overcome variations in static pressure, within the capabilities of the fan 10, caused by dust build-up, restricted building air inlets, cooling pads, light filters, or windy site conditions and maintain a constant airflow rate.

TABLE 4

| Airflow Rate CFM |  | 22,500 |  | 25,000 |  |
|---|---|---|---|---|---|
| Motor Type |  | BLDC |  | BLDC |  |
| Fan Speed RPM nominal |  | Varies |  | varies |  |
| Airflow Ratio |  | 1.00 |  | 1.00 |  |
|  |  | Power Input Watt | Fan Efficiency CFM/Watt | Power Input Watt | Fan Efficiency CFM/Watt |
| Static | 0.0 | 505 | 44.6 | 693 | 36.1 |
| Pressure | 0.05 | 685 | 32.9 | 879 | 28.4 |
| inches | 0.10 | 891 | 25.3 | 1,113 | 22.4 |
|  | 0.15 | 1,137 | 19.8 | 1,425 | 17.5 |
|  | 0.20 | 1,395 | 16.2 | 1,777 | 14.1 |

Table 5 shows the fan speed, current input, and power input for the fan 10 producing an airflow rate of approximately 22,500 CFM over a range of static pressures.

TABLE 5

| Static Pressure Inches | Airflow Rate CFM | Fan Speed RPM | Current Input AMPS | Power Input Watt |
|---|---|---|---|---|
| 0.00 | 22,538 | 380 | 3.71 | 505 |
| 0.05 | 22,538 | 415 | 4.95 | 685 |
| 0.10 | 22,506 | 449 | 6.29 | 891 |
| 0.15 | 22,474 | 482 | 7.84 | 1137 |
| 0.20 | 22,538 | 512 | 9.45 | 1395 |
| 0.25 | 22,538 | 541 | 11.28 | 1704 |
| 0.30 | 22,474 | 563 | 13.50 | 2150 |

Table 6 shows the fan speed, current input and power input for the fan 10 producing an airflow rate of approximately 25,000 CFM over a range of static pressures.

TABLE 6

| Static Pressure Inches | Airflow Rate CFM | Fan Speed RPM | Current Input AMPS | Power Input Watt |
|---|---|---|---|---|
| 0.00 | 24,999 | 425 | 4.95 | 693 |
| 0.05 | 24,999 | 455 | 6.13 | 879 |
| 0.10 | 24,970 | 487 | 7.65 | 1113 |
| 0.15 | 24,970 | 522 | 9.52 | 1425 |
| 0.20 | 24,970 | 554 | 11.61 | 1777 |

In the foregoing description, various features of the present invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated by reference herein in their entirety, with each claim standing on its own as a separate embodiment of the present invention.

It is intended that the foregoing description be only illustrative of the present invention and that the present invention be limited only by the hereinafter appended claims.

We claim:

1. A method for controlling airflow through a livestock confinement building having air inlets and outlets, the method comprising the steps of:
   a) providing a ventilation system having a plurality of BLDC fans in the livestock confinement building; and
   b) controlling each of the BLDC fans to be selectively operable in different control modes including a high efficiency mode and a constant airflow rate mode, wherein in the high efficiency mode the speed of at least one of the BLDC fans varies but energy consumed by the at least one BLDC fan remains substantially constant, and in the constant airflow rate mode the airflow rate remains substantially constant but energy consumed by the at least one BLDC fan varies, and wherein further in step (b), each of the plurality of BLDC fans is controlled without any external feedback sensors.

2. The method of claim 1, wherein further in step (b), the different control modes further include a constant torque mode and a constant speed mode.

3. The method of claim 1, wherein further in step (b), at least one of the plurality of the BLDC fans is operated at half airflow rate and at least one of the plurality of the BLDC fans is simultaneously operated at full airflow rate.

4. The method of claim 1, wherein further in step (b), at least one of the plurality of the BLDC fans is off and at least one of the plurality of the BLDC fans is simultaneously operated at half airflow rate.

5. The method of claim 1, wherein environmental conditions of the livestock confinement building vary and wherein further in step (b) in the constant airflow rate mode, the speed of each BLDC fan is adjusted to accommodate the environmental conditions of the livestock confinement building to maintain the constant airflow rate in the livestock confinement building.

6. The method of claim 1, wherein each of the BLDC fans includes a control system, wherein the control system includes a variable voltage input, and wherein further in step (b) to control the speed of each of the BLDC fans, a DC voltage between 0 and 10V is input into the variable voltage input of each control system of each fan to determine the speed of each fan.

7. The method of claim 1, wherein each of the BLDC fans includes a control system, wherein the control system includes a logic signal input, and wherein further in step (b) to control the speed of each of the BLDC fans, a 120V AC signal is input into the logic signal input to act as a switch to change the speed of each BLDC fan from a first speed to a second speed.

8. The method of claim 1, further comprising controlling an airflow rate of each BLDC fan to move outside air through the air inlets into the livestock confinement building to maintain a constant airflow rate through the livestock confinement building.

9. A process for maximizing growth of livestock in a livestock confinement building having air inlets and outlets, the process comprising the steps of:
   a) providing a ventilation system having a plurality of BLDC fans in the livestock confinement building;
   b) monitoring environmental conditions in the livestock confinement building; and
   c) controlling each of the BLDC fans to be selectively operable in different control modes including a high efficiency mode and a constant airflow rate mode, wherein in the high efficiency mode the speed of at least one of the BLDC fans varies but energy consumed by the at least one BLDC fan remains substantially constant, and in the constant airflow rate mode the airflow rate remains substantially constant but energy consumed by at least one BLDC fan varies, and wherein further in step (c), each of the plurality of BLDC fans is controlled without any external feedback sensors.

10. The process of claim 9, wherein further in step (c), the different control modes further include a constant torque mode and a constant speed mode.

11. The process of claim 9, wherein further in step (c), the speed of each BLDC fan is selected to control a temperature of the livestock confinement building to maintain a desired temperature in the livestock confinement building for growing the livestock.

12. The process of claim 9, wherein further in step (b), the growth rate of the livestock is monitored, a stage of growth is determined, and the speed of each of the BLDC fans is adjusted based upon the stage of growth of the livestock.

* * * * *